United States Patent Office 3,732,259
Patented May 8, 1973

3,732,259
BENZOQUINONE ETHERS AND PROCESS FOR
THEIR MANUFACTURE
Stefan Hari, Basel, Switzerland, assignor to Ciba-Geigy
AG, Basel, Switzerland
No Drawing. Filed July 15, 1969, Ser. No. 842,021
Claims priority, application Switzerland, July 29, 1968,
11,303/68
Int. Cl. C07c 49/64, 79/36, 147/06
U.S. Cl. 260—396 R    11 Claims

ABSTRACT OF THE DISCLOSURE

A process for the manufacture of benzoquinones of the formula

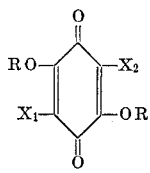

in which R represents an alkyl or cycloalkyl residue, $X_1$ represents a hydrogen or halogen atom or an electronegative substituent and $X_2$ represents a halogen atom or an electronegative substituent, wherein a dihydroxybenzoquinone of the formula

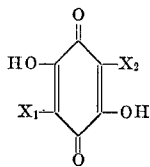

is reacted with an orthoformic acid ester.

---

It is known from the literature that 3,6-dihydroxybenzoquinones can be etherified with methanol in the presence of hydrogen chloride to form 3,6-dimethoxybenzoquinone [cf. R. Scholl and P. Dahl, Ber. 57, 83 (1924)], but this method does not work for the manufacture of 3,6-dialkoxybenzoquinones substituted in 2- and/or 5-position. Furthermore, it is not possible to use the dialkyl sulphates commonly employed for the alkylation of phenolic hydroxyl groups, because the presence of alkalis is necessary, and benzoquinones are not stable towards the latter. It is also known that phenolic hydroxyl groups can be etherified with dimethylformamide acetals. This method is also unsuitable for the manufacture of benzoquinone ethers, since only water-soluble complexes are obtained. Thus, no suitable process has hitherto been available for the manufacture of 3,6-dialkoxybenzoquinones substituted in 2- and/or 5-position.

This invention is based on the observation that 3,6-dialkoxybenzoquinones substituted in 2- and/or 5-position of the formula

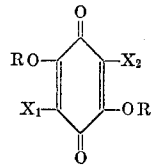

in which R represents an alkyl or cycloalkyl residue, $X_1$ represents a hydrogen atom or a substituent, especially a halogen atom or an electronegative substituent, and $X_2$ represents a halogen atom or an electronegative substituent, for example a nitro, cyano, alkylsulphonyl or arylsulphonyl group, can be obtained in a simple manner and in good yield by reacting a dihydroxybenzoquinone of the formula

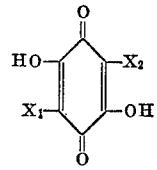

with an orthoformic acid ester.

The success of this process is surprising, since it is known from the literature that benzoquinone is reduced to hydroquinone by orthoformic acid triethyl ester [cf. A. Mustafa, Nature 162, 856 (1948) or Chem. Abstracts 1949 6515d].

The starting materials used for the process of the invention are preferably 2,5 - dinitro-3,6-dihydroxybenzoquinone (nitranilic acid), 2,5-dicyano-3,6-dihydroxybenzoquinone, 2,5 - diphenylsulphonyl - 3,6-dihydroxybenzoquinone or 2,5 - dihalogeno-3,6-dihydroxybenzoquinones, for example, 2,5 - dibromo - 3,6-dihydroxybenzoquinone (bromanilic acid) or 2,5 - dichloro-3,6-dihydroxybenzoquinone (chloranilic acid).

The orthoformic acid esters to be used are, in particular, the alkyl or cycloalkyl esters, advantageously the low alkyl esters. The following are given as examples: orthoformic acid methyl, ethyl, isopropyl, butyl, isobutyl, amyl, hexyl or cyclohexyl ester.

It is preferable to use at least two mols of the orthoformic acid ester for each mol of the dihydroxybenzoquinone. The reaction is advantageously carried out with the application of heat, for example, at a temperature within the range of from 50 to 150° C., preferably in the presence of an inert organic solvent, or in a large excess of the orthoformic acid ester. The alcohol formed during the reaction and the formic acid ester are advantageously removed from the reaction mixture by distillation. The reaction is generally finished after a short time. The dialkoxybenzoquinones are obtained in a good yield and in a good degree of purity. They may be used as intermediate products in the manufacture of dyestuffs, especially dioxazine dyestuffs, and auxiliaries.

The following examples illustrate the invention, the parts and percentages being by weight, unless otherwise stated.

EXAMPLE 1

5.0 parts of 2,5-dinitro-3,6-dihydroxybenzoquinone (nitranilic acid) are suspended in 26.9 parts of orthoformic acid triethyl ester and the suspension is heated to 90° C. within half an hour. A dark red solution forms at 65° C. and alcohol and formic acid ethyl ester are distilled. The batch is stirred for 15 minutes at 90° C. and is then cooled to 5° C. The 2,5-dinitro-3,6-diethoxybenzoquinone which precipitates is isolated by vacuum filtration, washed with petroleum ether and dried for 10 minutes in vacuo. 4.35 parts (70% of the theoretical yield) of an orange, crystalline powder melting at 164 to 165° C. are obtained.

Analysis.—Found (percent): C, 41.8; H, 3.5; N, 9.7. Calculated (percent): C, 41.96; H, 3.52; N, 9.79.

EXAMPLE 2

4.2 parts of 2,5-dichloro-3,6-dihydroxybenzoquinone (chloranilic acid) are suspended in 35.9 parts of orthoformic acid triethyl ester and the suspension is heated to 138° C. within 40 minutes. A dark red solution forms at 121° C. and alcohol and formic acid ethyl ester are distilled. The batch is then cooled to 10° C. The 2,5-dichloro-3,6-diethoxybenzoquinone which precipitates is isolated by vacuum filtration, washed with petroleum ether and dried in vacuo. 4.1 parts (75.4% of the theoretical yield) of an orange, crystalline powder melting at 100 to 102° C. are obtained. The melting point is 102 to 104° C. after recrystallization from petroleum ether. [Literature: 104 to 105° C., cf. A. Ya. Berlin and co-workers, J. Gen. Chem. USSR 30, 1380 (1960)].

EXAMPLE 3

5.0 parts of 2,5-dinitro-3,6-dihydroxybenzoquinone (nitranilic acid) are reacted with 26.9 parts of orthoformic acid trimethyl ester according to the process described in Example 1. 2,5 - dinitro-3,6 - dimethoxybenzoquinone is obtained in the form of a yellow crystalline powder melting at 185 to 186° C. in a yield of 3 parts, corresponding to 53% of the theoretical yield. The melting point is between 187 and 188° C. after recrystallization from benzene.

EXAMPLE 4

5.0 parts of 2,5-dinitro-3,6-dihydroxybenzoquinone (nitranilic acid) are suspended in 26.9 parts of orthoformic acid trimethyl ester and the suspension is heated to 92° C. within 40 minutes. The solution thus formed is stirred for 15 minutes at 92° C. and is then evaporated completely in vacuo. The solid residue is suspended in 10 parts by volume of ether, the suspension is vacuum filtered and the filter residue is dried in vacuo. 3.7 parts (65% of the theoretical yield) of 2,5-dinitro-3,6-dimethoxybenzoquinone are obtained in the form of a brownish yellow, crystalline powder melting at 182 to 184° C. 2,5-dinitro - 3,6 - dipentyloxybenzoquinone is prepared in an analogous manner from 2,5-dinitro-3,6-dihydroxybenzoquinone (nitranilic acid) and orthoformic acid tripentyl ester, but the residue is suspended in a small amount of petroleum ether and not in ether. It is an intense yellow powder melting at 78 to 80° C.

EXAMPLE 5

5.0 parts of 2,5 - dinitro - 3,6-dihydroxybenzoquinone (nitranilic acid) are suspended in 160 parts by volume of anhydrous benzene; 22.4 parts of orthoformic acid trimethyl ester are added and the batch is heated to the boil within 30 minutes. The solution thus formed is stirred for one hour at the boil, during which a small amount of liquid distills, and it is then evaporated completely in vacuo. The residue is washed on a vacuum filter with 20 parts by volume of a 1:1 mixture of ether and petroleum ether and then dried in vacuo. 4.75 parts (85% of the theoretical yield) of 2,5-dinitro-3,6-dimethoxybenzoquinone melting at 179 to 182° C. are obtained.

The following quinone derivatives of the general formula

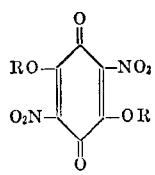

can be obtained in an analogous manner by reacting nitranilic acid with orthoformic acid propyl, isopropyl and butyl ester:

| Number | R | Yield, percent | Melting point (° C.) |
|---|---|---|---|
| 1 | (CH₂)₂—CH₃ | 64 | 112–113 |
| 2 | CH(CH₃)₂ | 74 | ¹169 |
| 3 | (CH₂)₃—CH₃ | 66 | 112–114 |

¹ Deflagrates.

EXAMPLE 6

2.1 parts of 2,5 - bis - phenylsulphone-3,6-dihydroxybenzoquinone are suspended in 36 parts of orthoformic acid triethyl ester, the suspension is heated to 132° C. within 30 minutes and stirred at that temperature for 45 minutes. Although a solution is not formed, a certain amount of alcohol and formic acid ethyl ester is distilled. The batch is cooled to 10° C. and the product of the formula

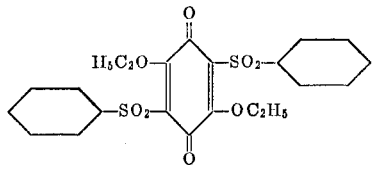

is isolated by vacuum filtration, washed with ether and dried in vacuo at 65° C. It is a yellow powder melting at 221 to 222° C. The yield is 1.8 parts (75% of the theoretical yield).

Analysis.—Found (percent): C, 55.3; H, 4.2; S, 13.6. Calculated (percent): C, 55.45; H, 4.23; S, 13.46.

The 2,5 - bis - phenylsulphone - 3,6 - dihydroxybenzoquinone used as starting material is prepared from 2,5-bis-phenylsulphone-3,6-dichlorobenzoquinone by treating with dilute sodium hydroxide solution. 2,5-bis-phenylsulphone-3,6-dimethoxybenzoquinone can also be prepared in a manner analogous to that described in this example.

Yield: 78% of the theoretical yield, melting point: 250 to 252° C.

EXAMPLE 7

1.0 parts of 2,5-dinitro-3,6-dihydroxybenzoquinone (nitranilic acid) is dissolved hot in 11 parts of orthoformic acid triethyl ester, the solution is stirred for 5 minutes, filtered while hot and then cooled to 0 to 5° C. The precipitate which forms is isolated by vacuum filtration, washed with 10 parts by volume of a 1:1 mixture of ether and petroleum ether and dried. The yield of 2,5-dinitro-3,6-diethoxybenzoquinone is 0.65 part (52% of the theoretical yield). The product melts at 160 to 161° C.

The following quinone derivatives of the general formula

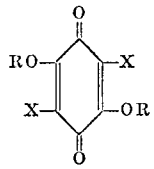

can be prepared in an analogous manner and in good yields:

| Number | X | R | Melting point (° C.) |
|---|---|---|---|
| 1 | NO₂ | CH₂—CH=CH₂ | 117–118 |
| 2 | SO₂—C₆H₅ | CH₂—CH₂—CH₂—CH₂—CH₃ | 212–214 |
| 3 | CN | CH₃ | ¹230 |
| 4 | CN | CH₂—CH₃ | 195–196 |
| 5 | CN | CH₂—CH₂—CH₃ | 179–180 |
| 6 | CN | CH₂—CH₂—CH₂—CH₃ | 172–173 |
| 7 | SO₂—C₆H₅ | CH₂—CH₂—CH₂—CH₃ | 220–223 |

¹ Decomposition.

EXAMPLE 8

4.2 parts of 2,5-dichloro-3,6-dihydroxybenzoquinone (chloranilic acid) are suspended in 44.8 parts of orthoformic acid trimethyl ester and the suspension is heated to 95° C. The solution thus formed is stirred for 3 hours at 95 to 99° C., during which formic acid methyl ester and methyl alcohol are distilled. The batch is then cooled to 5° C., the 2,5-dichloro-3,6-dimethoxybenzoquinone which precipitates is isolated by vacuum filtration, washed with petroleum ether and dried in vacuo at 65° C. It is a reddish orange, crystalline powder melting at 138 to 141° C. [Literature: 141 to 142° C., cf. C. Graebe, Liebigs Ann. Chem. 340, 248 (1905)]. The yield is 3.05 parts (65% of the theoretical yield). 2,5-dichloro-3,6-diisopropyloxybenzoquinone (golden yellow powder melting at 101 to 102° C.) can be prepared in the same manner.

EXAMPLE 9

6.0 parts of 2,5-dibromo-3,6-dihydroxybenzoquinone (bromanilic acid) are suspended in 35.9 parts of orthoformic acid triethyl ester and the suspension is heated to 136° C. within 75 minutes. A clear, dark red solution forms at 111° C. and ethanol and formic acid ethyl ester are distilled. The solution is stirred for 35 minutes at 136° C. and is then cooled to 10° C. The product is isolated in a manner analogous to that described in Example 2. The yield is 5.2 parts (73% of the theoretical yield) of a reddish orange, crystalline powder melting at 135 to 137° C. Its melting point is 138 to 139° C. after recrystallization.

EXAMPLE 10

5.7 parts of 3,6-dihydroxy-1,4-benzoquinone-2,5-dicarboxylic acid diethyl ester are suspended in 31.4 parts of orthoformic acid triethyl ester and the suspension is heated to 122° C. within 40 minutes. A clear, brown solution forms at 100° C. and alcohol and formic acid ethyl ester are distilled. The solution is stirred for 30 minutes at 122 to 131° C. and is then evaporated completely in vacuo. The oil which remains is allowed to stand for 2 hours. The 3,6-diethoxy-1,4-benzoquinone-2,5-dicarboxylic acid diethyl ester which thereby precipitates is isolated by vacuum filtration, washed in 10 parts by volume of a 1:1 mixture of ether and petroleum ether and then dried in vacuo. It is a brownish yellow, crystalline powder melting at 57 to 61° C. The yield is 3.6 parts (53% of the theoretical yield). When crystallized from glacial acetic acid, the product melts at 63 to 65° C.

EXAMPLE 11

5.1 parts of 2-chloro-5-bromo-3,6-dihydroxybenzoquinone (chlorobromanilic acid) are suspended in 35.9 parts of orthoformic acid triethyl ester and the suspension is heated to 135° C. within 40 minutes. A clear, dark red solution forms at 117° C. and alcohol and formic acid ethyl ester are distilled. The solution is then cooled to 10° C. The 2-chloro-5-bromo-3,6-diethoxybenzoquinone which thereby precipitates is isolated by vacuum filtration, washed with 10 parts by volume of a 1:1 mixture of petroleum ether and ether and dried in vacuo at 60° C. 4.75 parts (77% of the theoretical yield) of a reddish orange, crystalline powder melting at 116 to 118° C. are obtained. Its melting point is 117 to 118° C. after recrystallization from glacial acetic acid.

*Analysis.*—Found (percent): C, 38.3; H, 3.2; Br, 25.5 [1]; Cl, 11.3 [1]. Calculated (percent): C, 38.8; H, 3.3; Br, 25.8; Cl, 11.4.

The 2-chloro-5-bromo - 3,6 - dihydroxybenzoquinone (chlorobromanilic acid) can be obtained in the following manner: 2.6 parts of 2-chloro-3,6-dihydroxybenzoquinone in 70 parts by volume of glacial acetic acid are heated to 93° C. and then a solution of 3.1 parts of bromine in 10 parts by volume of glacial acetic acid is added. The red solution is heated at 112° C. for 45 minutes, hydrogen bromide evolving at 100° C., and is then cooled to 20° C. The 2-chloro-5-bromo-,3,6-dihydroxybenzoquinone (chlorobromanilic acid) which thereby precipitates is isolated by vacuum filtration, washed with petroleum ether and then dried in vacuo at 60° C. 3.3 parts (88% of the theoretical yield) of a vermilion, crystalline powder are obtained which carbonizes at a temperature between 273 and 276° C. when heated in a melting point tube.

[1] Obtained arithmetically from the total halogen.

*Analysis.*—Found (percent): C, 28.5; H, 0.9; Br, 31.1 [1]; Cl, 13.9 [1]. Calculated (percent): C, 28.4; H, 0.8; Br, 31.5; Cl, 13.99.

2-chloro-3,6-dihydroxybenzoquinone does not melt at 240° C. as stated in the literature [cf. Fr. Kehrmann and W. Tierler, J. Pr. Chem. [2], 40, 481 (1899], but at 193 to 194° C., with decomposition.

*Analysis.*—Found (percent): C, 41.6; H, 1.7; Cl, 20.3. Calculated (percent): C, 41.3; H, 1.7; Cl, 20.3.

I claim:

1. A process for the manufacture of benzoquinones of the formula

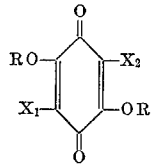

in which R represents lower alkyl, $X_1$ represents a hydrogen or halogen atom or a electronegative cyclohexyl or acryl, $X_1$ is hydrogen or an electronegative substituent and $X_2$ is an electronegative substituent, said electronegative substituent being selected from the group consisting of halogen, cyano, nitro, phenylsulfonyl, ethoxy carbonyl and alkylsulfonyl, wherein a dihydroxybenzoquinone of the formula

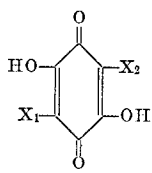

is reacted with an orthoformic acid ester at a temperature of between 50–150° C.

2. A process as claimed in claim 1, wherein the starting material used is 2,5-dinitro-3,6-dihydroxybenzoquinone.

3. A process as claimed in claim 1, wherein the starting material used is 2,5-dihalogeno-3,6-dihydroxybenzoquinone.

4. A process as claimed in claim 1 wherein an orthoformic acid trialkyl ester is used.

5. A process as claimed in claim 1 wherein at least two mols of the orthoformic acid ester are used for each mol of the dihydroxybenzoquinone.

6. A process as claimed in claim 1, which is carried out in the presence of an inert organic solvent or in an excess of the orthoformic acid ester.

7. Benzoquinones of the formula

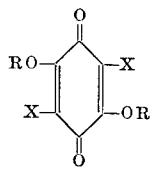

in which R represents lower alkyl or cyclohexyl and X represents nitro, or phenylsulfonyl.

8. Benzoquinones of the formula

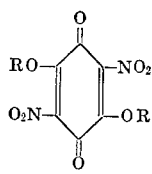

in which R represents lower alkyl.

9. The compound of the formula
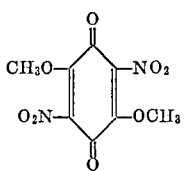
10. The compound of the formula
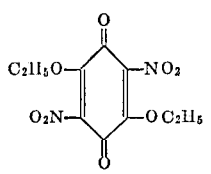
11. The compound of the formula
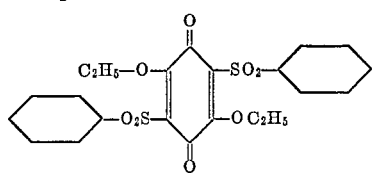
References Cited
UNITED STATES PATENTS
2,288,198 6/1942 Langbein _____ 260—396
2,743,286 4/1956 Rodgers _____ 260—396
OTHER REFERENCES
Scholl et al.: Ber., 57, 83 (1924).
Mustafa: Nature, 162, 856 (1948).
Chemical Abstracts, 25: 54052, 48: 8754b, 52: 9156e.
VIVIAN GARNER, Primary Examiner
U.S. Cl. X.R.
260—246 R